(12) United States Patent
Robertson et al.

(10) Patent No.: US 7,916,123 B2
(45) Date of Patent: Mar. 29, 2011

(54) USER INTERFACE TECHNIQUE FOR MANAGING AN ACTIVE CALL

(75) Inventors: Ryan Robertson, Seattle, WA (US); Eric Williams, University Place, WA (US); Stephane Maes, Mountain View, CA (US); Timothy Twerdahl, Los Altos, CA (US); Carl Stone, Campbell, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/770,504

(22) Filed: Apr. 29, 2010

(65) Prior Publication Data

US 2010/0273466 A1 Oct. 28, 2010

Related U.S. Application Data

(63) Continuation of application No. 11/800,051, filed on May 3, 2007, now Pat. No. 7,812,817, which is a continuation of application No. 09/981,510, filed on Oct. 17, 2001, now Pat. No. 7,231,208.

(51) Int. Cl.
    *G09G 5/00* (2006.01)
(52) U.S. Cl. ........................................ 345/169; 455/416
(58) Field of Classification Search ............ 345/1.1–1.3, 345/156–173; 455/416, 500, 518, 519, 403
    See application file for complete search history.

(56) References Cited

U.S. PATENT DOCUMENTS

| | | | |
|---|---|---|---|
| 4,279,021 A | 7/1981 | See et al. | |
| 4,415,065 A | 11/1983 | Sandstedt | |
| 4,587,630 A | 5/1986 | Straton et al. | |
| 4,725,694 A | 2/1988 | Auer et al. | |
| 4,764,770 A | 8/1988 | Church | |
| 4,887,212 A | 12/1989 | Zamora et al. | |
| 4,892,981 A | 1/1990 | Soloway et al. | |
| 4,916,441 A | 4/1990 | Gombrich | |
| 5,010,547 A | 4/1991 | Johnson et al. | |
| 5,012,219 A | 4/1991 | Henry | |
| D320,598 S | 10/1991 | Auerbach et al. | |
| 5,067,164 A | 11/1991 | Denker et al. | |
| 5,075,684 A | 12/1991 | DeLuca | |

(Continued)

FOREIGN PATENT DOCUMENTS

EP 0149762 7/1986

(Continued)

OTHER PUBLICATIONS

"An Introduction to Mobile Messaging," Mobile Messaging, May 2003, [online] [Retrieved on Dec. 10, 2004] Retrieved from the Internet: URL:http://www.lebodic.netlintro.htm.

(Continued)

*Primary Examiner* — Nitin Patel
(74) *Attorney, Agent, or Firm* — Foley & Lardner LLP

(57) ABSTRACT

A portable electronic device includes a housing, a processor supported by the housing, a memory coupled to the processor, and a communications transceiver coupled to the processor. The transceiver is configured to support voice conference calling between more than two parties. A program stored in the memory and running on the processor is configured to provide a user interface on the display which is configured to display indicators representative of the parties on the conference call. The user interface includes the hold area configured to display indicators representative of the parties on hold and an active area configured to display indicators representative of the parties active on the conference call.

20 Claims, 10 Drawing Sheets

U.S. PATENT DOCUMENTS

| | | | |
|---|---|---|---|
| 5,101,439 A | 3/1992 | Kiang | |
| 5,218,188 A | 6/1993 | Hanson | |
| 5,227,614 A | 7/1993 | Danielson et al. | |
| 5,334,824 A | 8/1994 | Martinez | |
| 5,335,276 A | 8/1994 | Thompson et al. | |
| 5,336,001 A | 8/1994 | Lichtenberg | |
| 5,345,615 A | 9/1994 | Garofalo | |
| 5,357,065 A | 10/1994 | Mitamura et al. | |
| 5,359,317 A | 10/1994 | Gomez et al. | |
| 5,379,057 A | 1/1995 | Clough et al. | |
| 5,392,447 A | 2/1995 | Schlack et al. | |
| 5,394,140 A | 2/1995 | Wong et al. | |
| D359,920 S | 7/1995 | Sakamoto | |
| 5,430,436 A | 7/1995 | Fennell | |
| 5,465,401 A | 11/1995 | Thompson | |
| 5,494,363 A | 2/1996 | Hochgesang | |
| 5,503,484 A | 4/1996 | Louis | |
| 5,510,808 A | 4/1996 | Cina, Jr. et al. | |
| 5,584,054 A | 12/1996 | Tyneski et al. | |
| 5,612,682 A | 3/1997 | DeLuca et al. | |
| 5,619,555 A | 4/1997 | Fenton et al. | |
| 5,627,978 A | 5/1997 | Altom et al. | |
| 5,650,776 A | 7/1997 | Mitchell et al. | |
| 5,705,995 A | 1/1998 | Laflin et al. | |
| 5,742,894 A | 4/1998 | Jambhekar et al. | |
| 5,745,904 A | 4/1998 | King et al. | |
| 5,779,030 A | 7/1998 | Ikegami et al. | |
| 5,797,089 A | 8/1998 | Nguyen | |
| 5,797,098 A | 8/1998 | Schroeder et al. | |
| 5,809,115 A | 9/1998 | Inkinen | |
| 5,812,651 A | 9/1998 | Kaplan | |
| 5,813,778 A | 9/1998 | Shih | |
| 5,815,142 A | 9/1998 | Allard et al. | |
| 5,860,074 A | 1/1999 | Rowe et al. | |
| 5,903,852 A | 5/1999 | Schaupp et al. | |
| 5,917,905 A | 6/1999 | Whipple et al. | |
| 5,917,906 A | 6/1999 | Thornton | |
| 5,949,764 A | 9/1999 | Yoshida et al. | |
| 5,958,006 A | 9/1999 | Eggleston et al. | |
| 5,974,334 A | 10/1999 | Jones, Jr. | |
| D416,256 S | 11/1999 | Griffin et al. | |
| 6,002,944 A | 12/1999 | Beyda | |
| 6,006,109 A | 12/1999 | Shin | |
| 6,016,142 A | 1/2000 | Chang et al. | |
| 6,029,072 A | 2/2000 | Barber | |
| 6,035,214 A | 3/2000 | Henerson | |
| 6,055,439 A | 4/2000 | Helin et al. | |
| 6,058,304 A | 5/2000 | Callaghan et al. | |
| 6,084,951 A | 7/2000 | Smith et al. | |
| 6,097,391 A | 8/2000 | Wilcox | |
| 6,101,531 A | 8/2000 | Eggleston et al. | |
| 6,119,179 A | 9/2000 | Whitridge et al. | |
| 6,128,381 A * | 10/2000 | Holmstrom et al. | 379/356.01 |
| 6,133,916 A | 10/2000 | Bukszar et al. | |
| 6,157,630 A | 12/2000 | Adler et al. | |
| 6,166,342 A | 12/2000 | Chou | |
| 6,169,911 B1 | 1/2001 | Wagner et al. | |
| 6,188,917 B1 | 2/2001 | Laureanti | |
| 6,192,118 B1 | 2/2001 | Bayless et al. | |
| 6,198,053 B1 | 3/2001 | Chou | |
| 6,215,865 B1 | 4/2001 | McCalmont | |
| 6,243,452 B1 | 6/2001 | O'Shaughnessey et al. | |
| 6,256,631 B1 | 7/2001 | Malcolm | |
| 6,295,372 B1 | 9/2001 | Hawkins et al. | |
| 6,308,062 B1 * | 10/2001 | Chien et al. | 455/420 |
| 6,310,609 B1 | 10/2001 | Morgenthaler | |
| D454,349 S | 3/2002 | Makidera et al. | |
| 6,370,018 B1 | 4/2002 | Miller et al. | |
| D456,794 S | 5/2002 | Laverick et al. | |
| 6,389,124 B1 | 5/2002 | Schnarel et al. | |
| 6,405,172 B1 | 6/2002 | Baker et al. | |
| 6,415,138 B2 | 7/2002 | Sirola et al. | |
| D462,354 S | 9/2002 | Kimbre et al. | |
| 6,452,588 B2 | 9/2002 | Griffin et al. | |
| D464,962 S | 10/2002 | MacGregor et al. | |
| 6,502,090 B1 | 12/2002 | Raisanen | |
| D468,714 S | 1/2003 | Maruska et al. | |
| D470,842 S | 2/2003 | Bhatia et al. | |
| 6,516,202 B1 | 2/2003 | Hawkins et al. | |
| D471,559 S | 3/2003 | De Saulles | |
| 6,557,004 B1 | 4/2003 | Ben-Shachar et al. | |
| 6,577,721 B1 | 6/2003 | Vainio et al. | |
| 6,583,806 B2 | 6/2003 | Ludwig et al. | |
| D477,597 S | 7/2003 | Laverick et al. | |
| D488,478 S | 4/2004 | Laverick et al. | |
| 6,781,575 B1 | 8/2004 | Hawkins et al. | |
| 6,795,429 B1 * | 9/2004 | Schuster et al. | 370/352 |
| 6,917,917 B1 * | 7/2005 | Kim | 704/235 |
| 6,973,217 B2 | 12/2005 | Boliek et al. | |
| 6,976,217 B1 | 12/2005 | Vertaschitsch et al. | |
| 7,007,239 B1 | 2/2006 | Hawkins et al. | |
| 7,231,208 B2 * | 6/2007 | Robertson et al. | 455/416 |
| 7,295,852 B1 * | 11/2007 | Davis et al. | 455/518 |
| 7,319,743 B1 * | 1/2008 | Dunlap | 379/93.01 |
| 7,526,282 B2 * | 4/2009 | Gau | 455/416 |
| 2001/0034222 A1 | 10/2001 | Roustaei et al. | |
| 2002/0044136 A1 | 4/2002 | Griffin et al. | |
| 2002/0082043 A1 | 6/2002 | Wilska et al. | |
| 2004/0028192 A1 | 2/2004 | Pelletier | |
| 2006/0015819 A1 | 1/2006 | Hawkins et al. | |
| 2006/0033706 A1 | 2/2006 | Haitani et al. | |
| 2006/0121938 A1 | 6/2006 | Hawkins et al. | |
| 2006/0161858 A1 | 7/2006 | Hawkins et al. | |
| 2006/0168539 A1 | 7/2006 | Hawkins et al. | |
| 2008/0008163 A1 * | 1/2008 | Castell et al. | 370/352 |

FOREIGN PATENT DOCUMENTS

| | | |
|---|---|---|
| EP | 0704788 | 4/1996 |
| FR | 2760933 | 9/1998 |
| WO | WO 99/08238 | 2/1999 |

OTHER PUBLICATIONS

3GPP2 Multimedia Messaging System—MMS Specification Overview—Revision: A. Mobile Messaging, May 2003, [online] [Retrieved on Dec. 10, 20041 Retrieved from the Internet: URL:http://www.lebodic.net/left.htm.

Agrawal, P. et al., Get Wireless: A Mobile Technology Spectrum, IT PRO, IEEE, Jul./Aug. 1999, pp. 18-23.

American Programmer. American Programmer. Inc., Dec. 1991, pp. 4-33, N.Y.

At Last, Technology Harnesse [sic] One of the Most Powerf [sic] Forces known to Man., GO Corporation, 1991, 14 pages, Foster City.

AT&T New Release, NCR Cuts Price of 3170 Notebook Computer 11-to 19 Percent, Mar. 8, 1993, 2 pages, [online], retrieved from the Internet: URL:http://www.att.com/press/0393/930308.nca.html.

Carr, R.M., The Point of the Pen, Byte, Reprinted, Feb. 1991, 10 pages.

Chan, E. et al., Personal Digital Assistants & Wireless Convergence, MGMT 557 Strategic Management of Innovation, May 4, 2000, pp. 1-28.

Communications Solutions™ TMC Labs Test Drive, Mar. 2000, [online] [Retrieved on Aug. 23, 2005] Retrieved from the Internet: URL:http://www.tmcnet.com/articles/comsol/0300/0300labs1.htm.

Cullen, A., Connecting with Your EO Cellular Module, EO, Inc. 1992, 1993, pp. ii-33, Mountain View.

Cullen, A., Getting started with Your EO Personal Communicator, EO, Inc. 1992, 1993, pp. ii-74, Mountain View.

Cullen, A., Lookup Guide to the EO Personal Communicator, EO, Inc. 1992, 1993, pp. ii-320, Mountain View.

Definition of Handheld Computer, printed from the website: http://dictionary.reference.com, dated Feb. 11, 2004 (3 pgs).

Definition of Handheld, printed from the website: http://searchmobilecomputing.techtarget.com, dated Feb. 11, 2004 (3 pgs.).

Excerpts from Ericsson Mobile Phone 1888 WORLD User's Guide, Copyright 1998 Ericsson Mobile Communications AB.

Excerpts from Handspring VisorPhone™ User's Guide, Copyright 2000 Handspring, Inc.

Excerpts from Motorola Timeport Tri-Band Mobile Telephone Manual, Copyright 1999 Motorola, Inc.

GO Corporation Information Statement, Nov. 8, 1993, 114 pages.

Handheld Game Console—Wikipedia, the free encyclopedia, [online] [Retrieved on Oct. 13, 2006], Retrieved from the Internet: URL:http://en.wikipedia.orglwjkwHandheld_game_console.

Hewlett Packard, Products and Services, http://www/hp.com/, Nov. 11, 2001.

IBM Selects Racotek Data/Voice Communications Services to Interface with Touchmobile Product, PR Newswire, Jan. 26, 1993, 1 page.

IBM TouchMobile Solution for Data Capture and Communication, Keeping Your Business Moving in the 90s, International Business Machines Incorporated, Jan. 1993, 13 pages.

IBM TouchMoblle Information and Planning Guide, International Business Machines Incorporated, Mar. 1993, 20 pages.

IBM'S Touchmobile Helps Field Workers Collect Data at the Touch of a Finger, PR Newswire, Jan. 26, 1993, 1 page.

Ikeya, B., Detailed Overview of the PC Card Standard, PCMCIA, 1998, [online] [Retrieved on Oct. 13, 2005] Retrieved from the Internet: URL:http://www.pcmcia.org/pccarcJstandard.htm.

Introduction to PCMCIA Technical Tutorial, Dec. 6, 2002, pp. 1-11.

Kanellos, M., Qualcomm Merges Phone, Handheld, CNET News.com, Sep. 21, 1998, [online] [Retrieved on Sep. 20, 2005] Retrieved from the Internet: URL:http://www.news.com.com/Qualcomm+merges+phone%2C+handheld/2100-1001_3-215791.html.

MacNeill, D., Messaging Card and NewtonMail: We Pick Up and Deliver, On the Go Magazine, Oct. 13, 1993, 2 pages, [online] Retrieved from the Internet: URL:htto://www.pencomputing.com/Newton/NewtonNotes2.htrnl.

MacNeill, D., Wireless Newton Technology Goes to Work, On the Go Magazine, Sep. 8, 1993, 2 pages, [online] Retrieved from the Internet: URL:http://www.pencomputing.com/Newton/Newton-Notesl.html.

Maki, K., The AT&T EO Travel Guide, 1993, pp. iii-555, John Wiley & Sons, Inc., N.Y.

Nokia Introduces Mobile Chat With Nokia 3310, Sep. 1, 2000, [online] [Retrieved on Nov. 17, 2003] Retrieved from the Internet: URL:http://www.mobiletechnews.com/info/2000/09/01/142022.htm.

Nokia, Frequently Asked Questions [online] [Retrieved on Nov. 17, 2003] Retrieved from the Internet: URL:htto://www.nokia.co.in/nokia apac/india/faqs_list/0,18778,39_41,00.html.

Notice of Allowance for U.S. Appl. No. 11/800,051 (F&L Ref.: 035451-0298), mail date Jun. 11, 2010, 10 pages.

PCT International Search Report, PCT/US2000/22182, Jan. 10, 2001, 8 pages.

PCT Notification of Transmittal of International Preliminary Examination Report, PCT/US2000/22182, Oct. 26, 2001, 6 pages.

pdQ™ Basics Handbook, Qualcomm Incorporated, 1998, 1999, 96 pages.

Powell, E., Kyocera pdQ Smartphone—Brief Article—Product Announcement, 2000, lonlinel [Retrieved on Aug. 23, 2005] Retrieved from the Internet: URL:http://www.fIndartides.comIplartjdes/mj mOFAUTIs917/ai 65650619/print.

Printout of various website pages from biz.yahoo.com article "Conference Calling Added to BestNet's Service Designed for Palm OS(R) Handhelds"—Tuesday, Aug. 21, 2001.

Printout of various website pages from www.bestnetcall.com regarding pdaCall (patent pending), printed Aug. 31, 2001.

Qualcornm pdQ™ 1900 Digital PCTS SmartPhone, Qualcomm Incorporated, 1999, 2 pages.

Schlender. B. R., Hot New PCs That Read Your Writing, Fortune, Reprinted, Feb. 11, 1991. 6 pages.

Shah, R., The Qualcomm pdQ: Kill Two Birds with One Phone, CNN.com, Dec. 3, 1999, [online] [Retrieved on Sep. 20. 2005] Retrieved from the Internet: URL:http:llarchives.cnn.com/i999rrECHJptechJi2/o3/qualcomm.pdq/.

Stock, R., The World of Messaging an Introduction to Personal Communications, EO, Inc., 1992, 1993, pp. ii-69, Mountain View.

The Handheld Computing Industry—2000, Stanford Technology Ventures Program (STVP), Jan. 13, 2001, pp. 1-38.

T-Mobile Products; Handhelds, http://www.tmobile.com, Sep. 28, 2002, 2 pages.

T-Mobile Products; Sidekick, http://www.tmobile.com, Sep. 28, 2002, 3 pages.

Toshiba Computer Systems Group, http://www.toshiba.com, May 28, 2002, 1 page.

Toshiba Computer Systems Group: Pocket PC e570, http://www.pda.toshiba.com, Jul. 7, 2001, 2 pages.

* cited by examiner

USER INTERFACE TECHNIQUE FOR MANAGING AN ACTIVE CALL

CROSS REFERENCE TO RELATED APPLICATIONS

This application is a continuation of U.S. application Ser. No. 11/800,051 filed May 3, 2007, which is a continuation of U.S. application Ser. No. 09/981,510, filed Oct. 17, 2001. Both of these applications are incorporated herein by reference in their entireties.

BACKGROUND

Handheld computing devices, "palmtops," "palmhelds," personal digital assistants (PDAs), or handheld computers typically weigh less than a pound and fit in a pocket. These portable electronic devices generally provide some combination of personal information management, database functions, word processing, and spreadsheets as well as communications network connectivity, internet connectivity, voice memo recording, and telephony functions.

Handheld computing devices may include a wireless telephony device permitting the user to make wireless communications such as mobile telephone calls or data downloads or uploads to a computer network. It is conventional to employ a touch pad, touch screen, or handwriting recognition area and/or device to provide input to the handheld computer. If no dialing device such as a keypad is included, the user may use the touch pad, touch screen, or handwriting recognition area to control the wireless telephony device.

Ways in which handheld computers may permit wireless phone calls without the use of a conventional telephone keypad include using the touch screen to select the numbers from those displayed on the screen, using the address book function of the device to choose the desired number to call, and using a voice recognition system. Other ways can include dialing numbers from web pages or other helper applications.

A handheld computer that includes wireless telephony capability also requires the ability to manage the phone calls. The management of a single call is straightforward, but efficient management of multiple calls, in particular calls on multiple lines and conference calls, requires more sophisticated call management functionality.

The functions supported by a particular handheld computer with wireless telephony capability may correspond to an international standard such as Global System for Mobile Communications (GSM) standards set forth by the European Telecommunications Standards Institute (ETSI). The GSM standards may set forth the functionality required by the phone device, leaving it to the device maker to determine the most efficient user interface.

Conventional cellular phones having a hard keypad and small screen may support the call management functions set forth in various international standards. However, traditional cellular phones typically have a cumbersome method of managing calls because the user is limited to a non-touch screen display and twelve button keypad. Performing a straightforward function such as adding a new caller to an ongoing conference call can involve a series of key presses that are not readily apparent to the user.

Conventional wireless telephony devices that include a graphical user interface with touch screen display allow some improvement over the call management capabilities of classic cellular phones. These devices may have icons that permit the user to place callers on hold, add new callers, conference two callers together, or swap between phone lines. However, these devices may not support the full functionality required by GSM standards, and further do not typically provide a relatively straightforward graphical user interface for accessing call management features.

Therefore, there is a need for a handheld computer with wireless telephony capability that supports the full call management functionality set forth in international standards for digital cellular telecommunications systems while also having a user interface that permits efficient and easy to understand operation of the various call management functions.

The teachings herein below extend to those embodiments that fall within the scope of the appended claims, regardless of whether they accomplish one or more of the above-mentioned needs.

SUMMARY

An exemplary embodiment relates to a portable electronic device having a housing, a processor supported by the housing, a memory coupled to the processor, and a communications transceiver coupled to the processor. The transceiver is configured to support voice conference calling between more than two parties. A program stored in the memory in running on the processor is configured to provide a user interface on the display that is configured to display indicators representative of the parties on the conference call. The user interface includes a hold area of the display configured to display indicators representative of parties on hold and an active area of the display configured to display indicators representative of the parties active on the conference call.

Another exemplary embodiment relates to a method of managing a conference call on a handheld mobile telephone device. The method includes the steps of displaying to a user a screen including a new call option, initiating a first call at the request of a user, and placing the first call on hold at the request of a user and placing an indicator representative of the first call in a hold section of the display. The method further includes the steps of displaying to a user an available section of the display including a new call option, initiating a second call at the request of a user by selecting the new call option, and placing an indicator representative of the second call in an active section of the display.

Further, an exemplary embodiment relates to a user interface for a radio enabled handheld computer display screen that includes a first screen portion providing a first indicator representative of a first call of a conference call and a second screen portion providing a second indicator representative of a second call of a conference call. A user selectable option is configured to effectuate movement of at least one of the first indicator to the other of the first and second screen portion.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Figure 1:
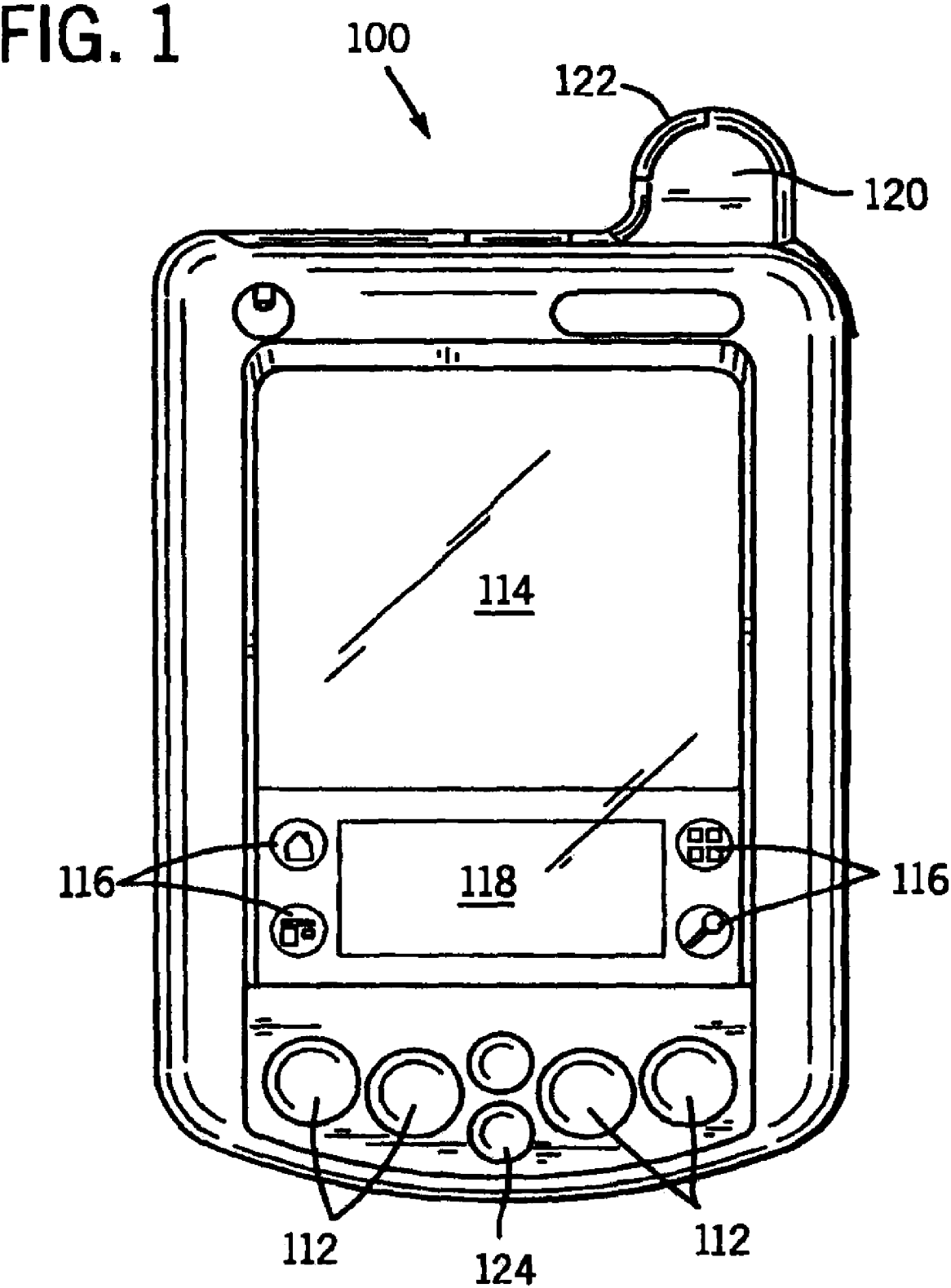
FIG. 1 is an exemplary front elevation view of a handheld computer.

Referring to FIG. 1, a portable electronic device, shown as, but not limited to, handheld computer 100 is depicted according to an exemplary embodiment. Handheld computer 100 may include Palm style computers manufactured by Palm, Inc., of Santa Clara, Calif. Other exemplary embodiments may include Windows CE handheld computers, or other handheld computers and personal digital assistants, as well as mobile telephones, and other mobile computing devices.

Preferably, handheld computer 100 includes memory, a processor, and interactive hardware and software that performs functions such as maintaining calendars, phone lists, task lists, note pads, calculator applications, spreadsheets, games, and other applications capable of running on a computing device. Further, handheld computer 100 may be configured for such functions as voice memo recording and playback as well as communications network connectivity, internet connectivity and wireless telephony.

Handheld computer 100, depicted in FIG. 1, includes a plurality of input function keys 112 and a display 114 having graphical user interface features. Display 114 may be provided with a touch screen interface that allows a user to select and alter displayed content using a pointer, such as, but not limited to, a stylus, a pen tip, a fingertip, or other pointing devices.

Referring again to FIG. 1, in an exemplary embodiment, display 114 also includes a Graffiti™ (or other handwriting recognition software) writing section 118 for tracing alphanumeric characters as input. A plurality of input icons 116 for performing automated or preprogrammed functions maybe be provided on a portion of display 114.

In an exemplary embodiment, handheld computer 100 may include an integrated antenna 120 configured to transmit and receive wireless communication signals, such as, but not limited to, cellular telephone communication signals and other radio frequency (RF) communications signals. A communications transceiver (not shown) may be coupled to the processor to support such communications. Antenna 120 may further include an indicator light 122 integrated into antenna 120 for indicating the transmission and reception of wireless communication signals. Further, light 122 may be used to indicate other states of handheld computer 100.

In an exemplary embodiment, handheld computer 100 also includes navigation buttons 124 that may be utilized for navigating or scrolling of information displayed on display 114. Further, navigation buttons 124 may be programmed for other uses depending on the application running on handheld computer 100.

Handheld computer 100 may be used for any of a variety of wireless communications, including, but not limited to, communications with the World Wide Web, mobile telephone communications, e-mail communications, etc. In an exemplary embodiment, a user may use the wireless communication function by interacting with display 114. Ways in which display 114 can be used include using a stylus to select numbers on a displayed keypad, selecting numbers from an address book, or having preprogrammed numbers associated with input icons 116.

Handheld computer 100 may also include a conventional telephone keypad permitting manual entry of numbers by depressing keys rather than interacting with the touch screen display 114.

In embodiments in which handheld computer 100 includes wireless telephony capability, an interface is required to permit the user to perform the various phone-related functions available on the device. One method of providing the user interface for call management may include presenting the user interface on display 114. FIGS. 2-5 depict the various screens associated with the call management user interface of an exemplary embodiment.

Figure 2:
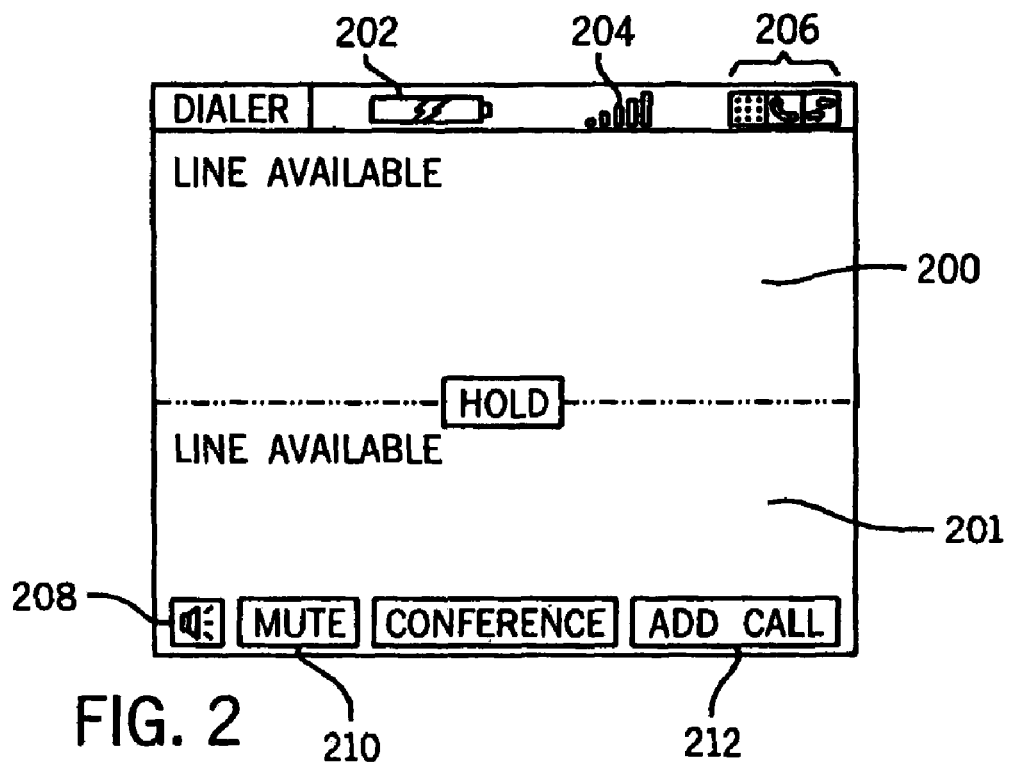
FIG. 2 illustrates a basic call management user interface screen for a handheld computer.

Referring to FIG. 2, an exemplary screen that can be used for call management is depicted, showing the baseline state when no calls are active. In an exemplary embodiment, this information is displayed on touch screen display 114. Display 114 may include a battery gauge 202 that shows the battery level of handheld computer 100, a signal strength icon 204 that indicates the signal strength of the phone, and a plurality of other navigation icons 206 that permit the user to navigate to other displays. A speaker icon 208 permits the user to adjust the volume of the device, and a mute button 210 permits the user to mute the microphone. An add call button 212 permits the user to initiate a new call.

The screen depicted in FIG. 2 is divided into two portions, an upper portion shown as upper bucket 200, and a lower portion, shown as lower bucket 201. Upper bucket 200 and lower bucket 201 are used to logically divide information displayed on exemplary screens in FIGS. 2-5. FIG. 2 includes no caller information in either upper bucket 200 or lower bucket 201 because there are no active calls. Upper bucket 200 and lower bucket 201 may be labeled "line available" to indicate the availability of two phone lines, each corresponding to one of the buckets 200, 201.

In the wireless phone embodiment depicted in FIGS. 2-5, handheld computer 100 can include two lines available to host wireless phone calls. A single line may support a conference call and therefore be hosting multiple calls, although only one line can support a conference call at a given time. Bucket 200 and bucket 201 each display information corresponding to a different one of the phone lines. The division of information into buckets 200 and 201 aids the user in call management as will become apparent with the description of FIGS. 3-5.

Figure 3A:
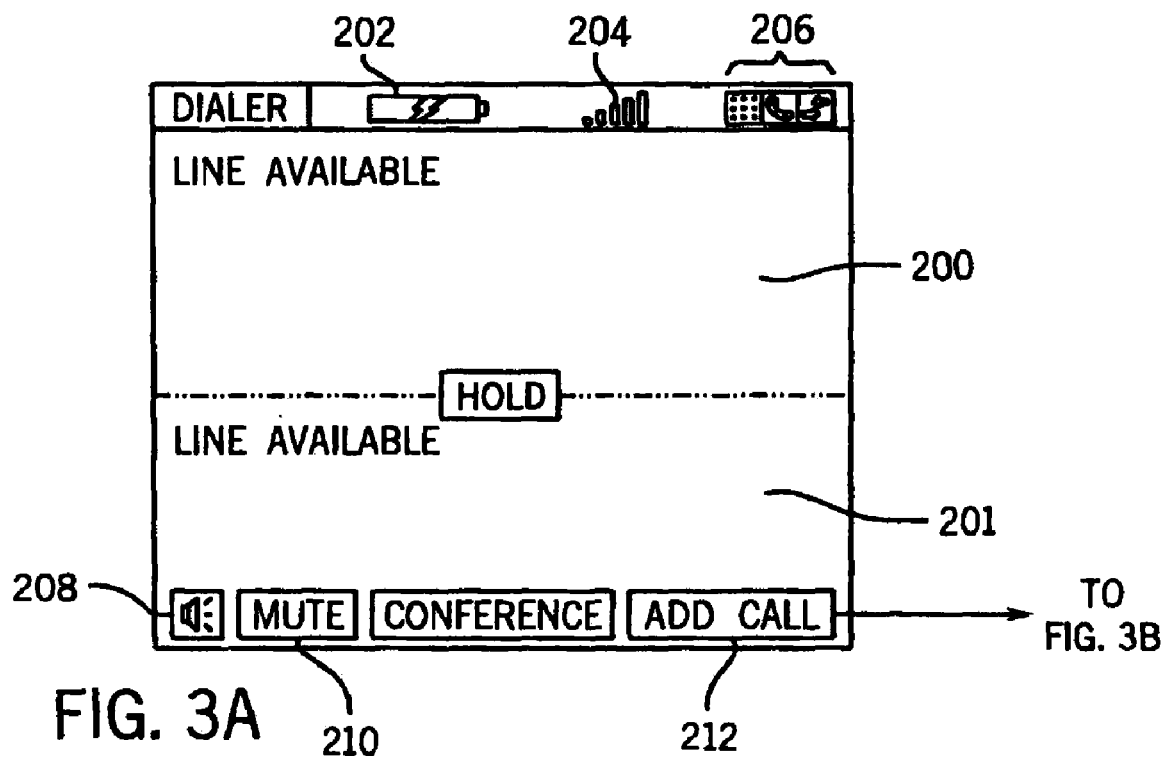
FIGS. 3A-3E illustrate screens associated with the management of a single call with a handheld computer.

Referring to FIGS. 3A-3E, a number of exemplary screens depict the call management user interface for handling a single call. FIG. 3A depicts the baseline screen shown in FIG. 2, where the user may depress the add call button 212 to initiate a new call. Placing a call to a particular party can include choosing a name from an address book, tapping numbers on a displayed keypad, writing numbers into writing section 118 (see FIG. 1) using a stylus, or using a voice recognition system. Tapping the add call button 212 will permit the user to choose the type of dial sequence desired for initiating the call.

In addition to tapping the add call button 212, another way of connecting to a new call is to receive an external call. When an external call is received by handheld computer 100, handheld computer 100 will transfer the currently active call (if any) to on hold status to permit user to receive the external call if a line is available. In this way, the reception of an external call results in a similar functionality to tapping the add call button 212. If a free line is not available, or if the user decides not to answer external call, the call will be routed to voice mail.

Figure 3B:
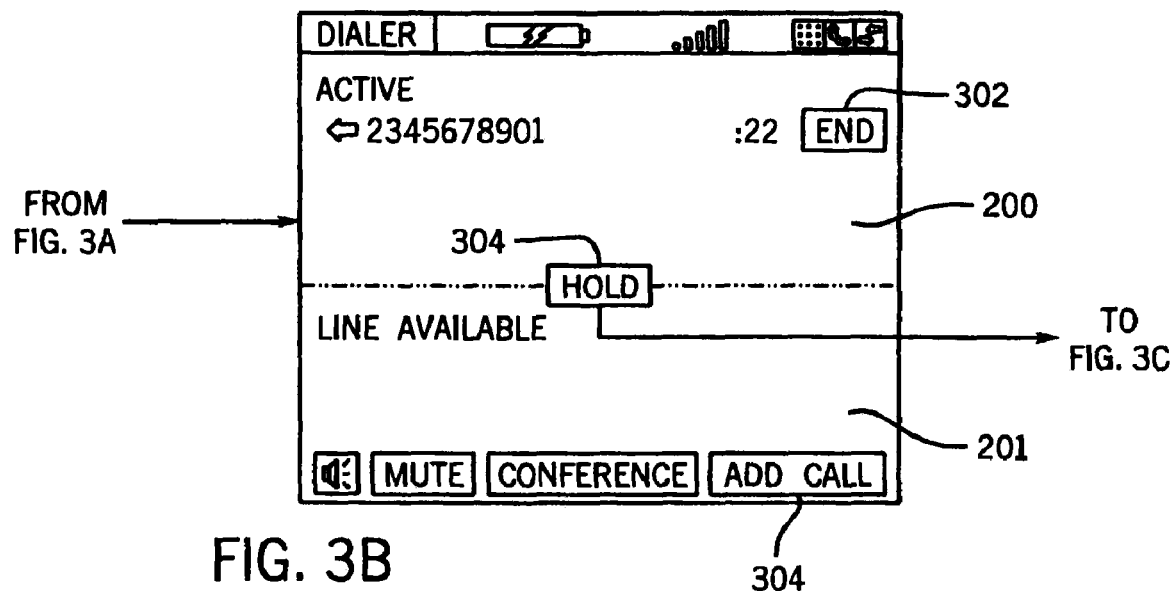

FIG. 3B depicts the user interface once a single call is active. The call indicator phone number, name, or other identifying graphic) is displayed in upper bucket 200, while lower bucket 201 indicates that a line is available. A call timer indicating the elapsed time of the call may be displayed as well. An end button 302 will disconnect the active call.

Figure 3C:
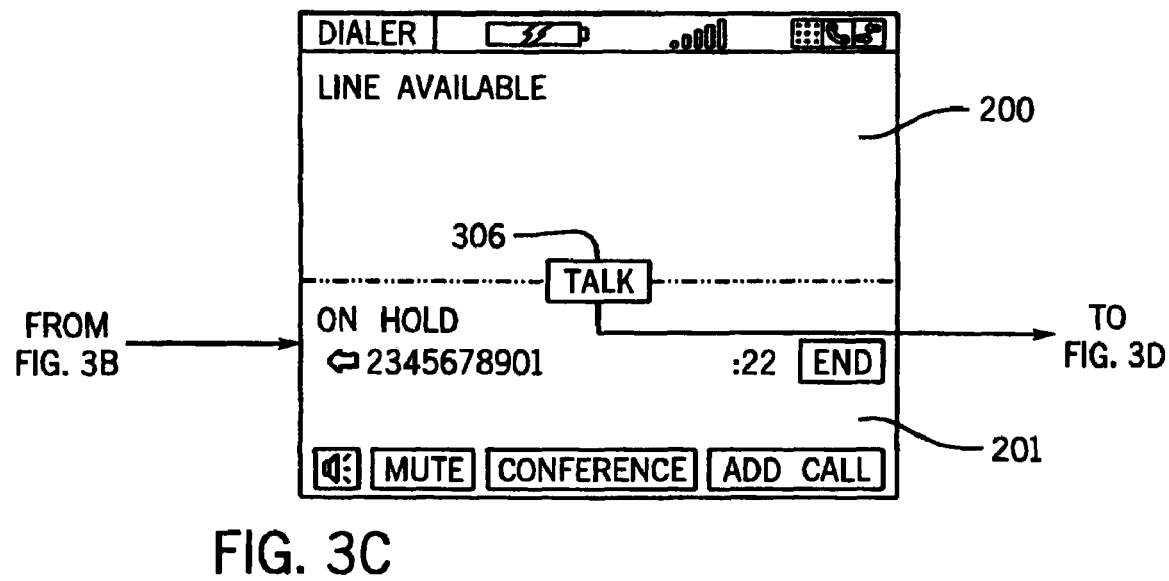
Figure 3D:
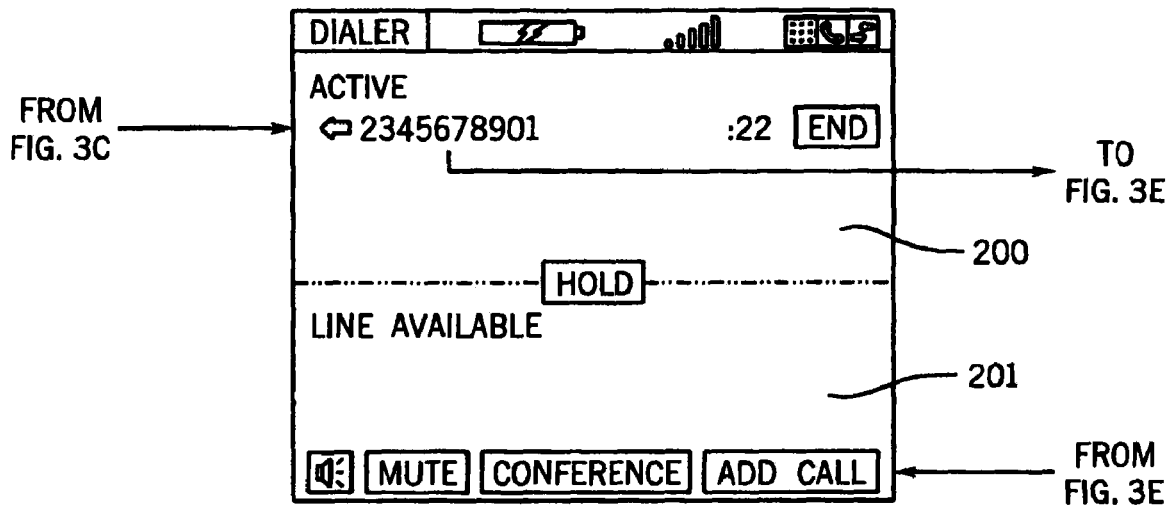
Figure 3E:
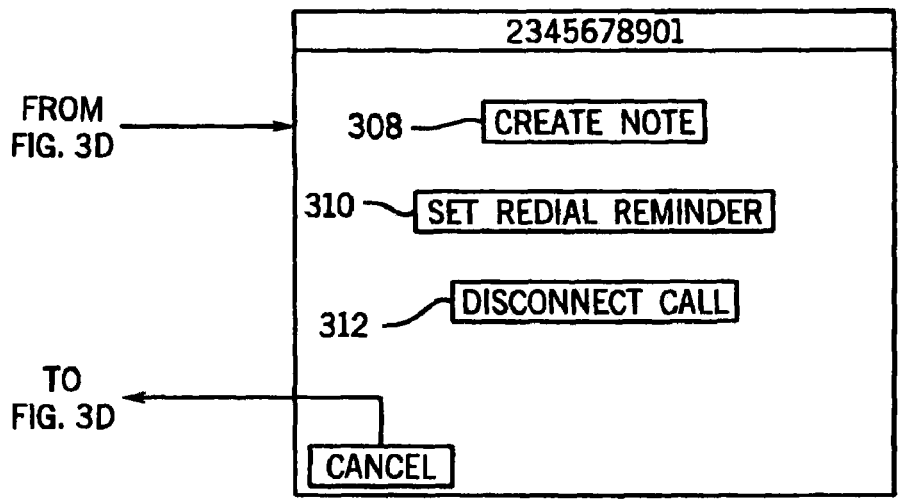

Once a call is active, as depicted in FIG. 3B, a hold icon, shown as, but not limited to, hold button 304 will permit the user to place the active line on hold as depicted in FIG. 3C. When the active line is placed on hold, the screen will so indicate and a talk button 306 will appear (see FIG. 3C) to permit the user to move the on hold call back into active call status as depicted in FIG. 3D.

If the user taps on a call identifier (e.g. identifier "2345678901" shown in upper bucket 200 of FIG. 3D), screen 3E will be displayed. Button 308 will permit the user to create a note to be stored in the memory of handheld computer 100. If a note is already present for the particular contact associated with the call identifier, the previously created note will be displayed. If the contact is not in the address book of handheld computer 100, the user may save the caller's information to the address book. Redial reminder button 310 may be used to set a redial reminder for the particular caller. Disconnect call button 312 permits the user to disconnect the call.

Figure 4A:
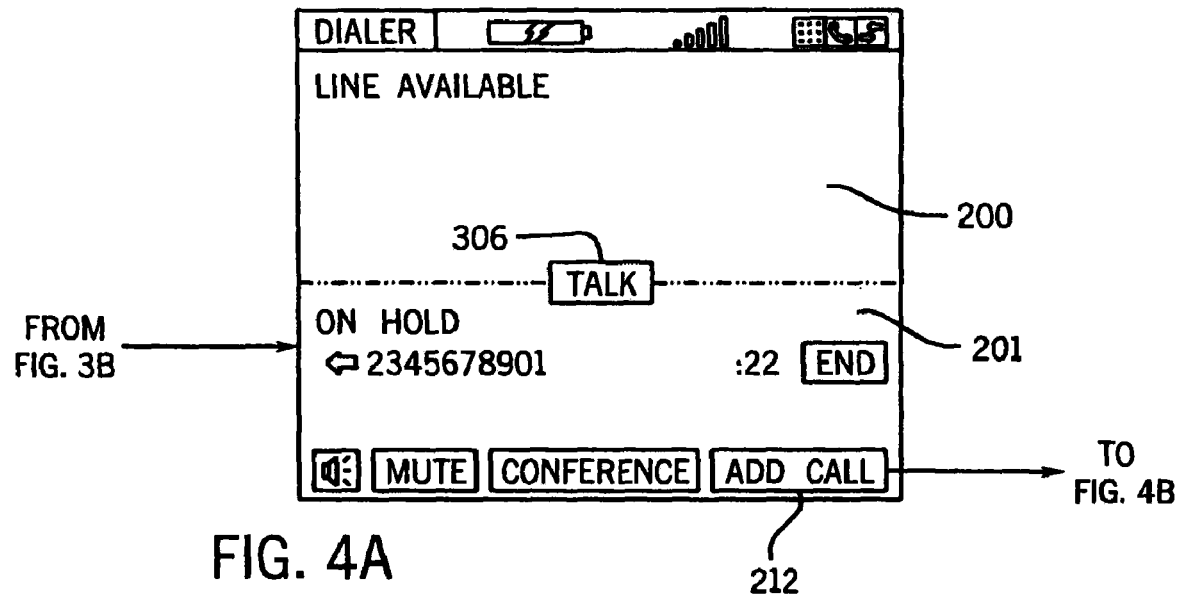
FIGS. 4A-4G illustrate screens associated with the management of two calls with a handheld computer.
Figure 4B:
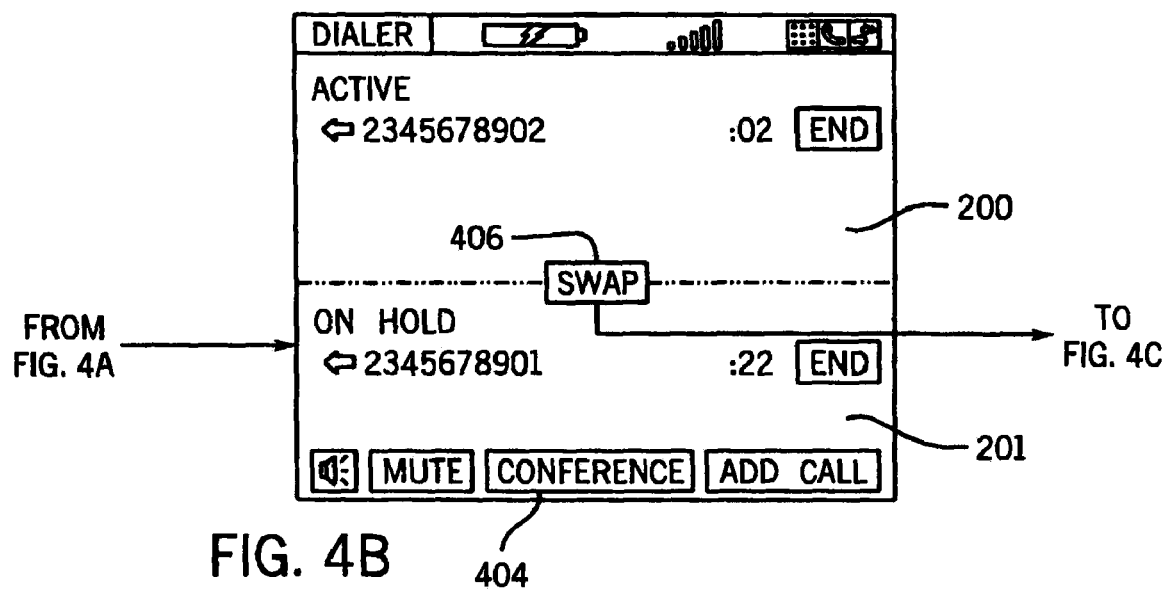
Figure 4C:
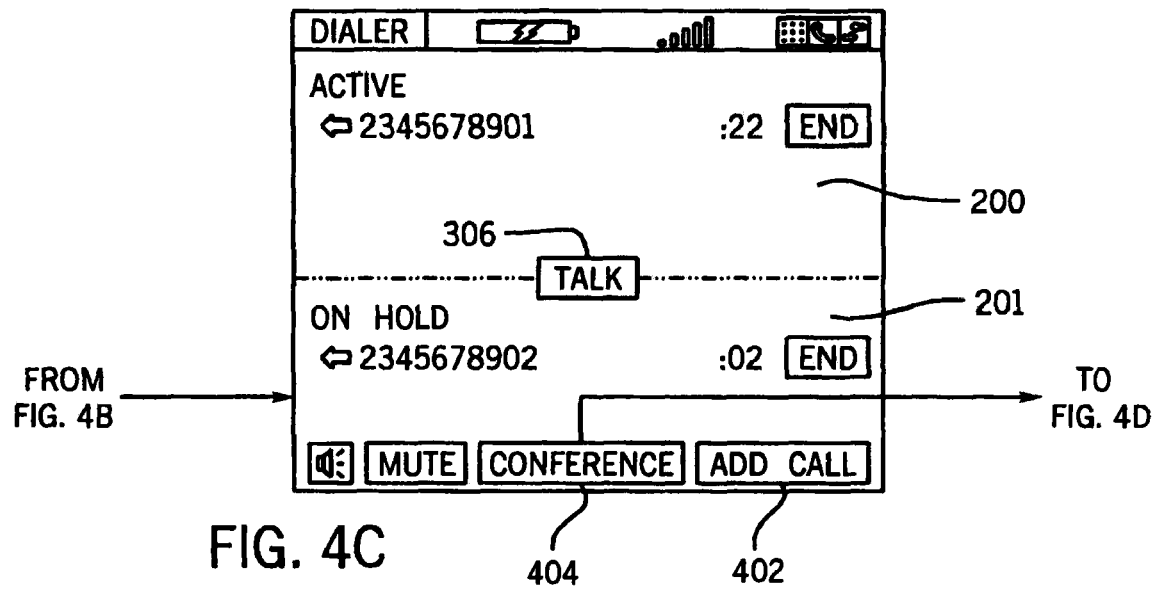

FIGS. 4A-4G depict the call management user interface for handling two calls. FIG. 4A is similar to FIG. 3C and includes add call button 212 that permits the user to use a dial application to connect a new active call on the available line. Tapping add call button 212 automatically places the active call on hold (if not already on hold as depicted in FIG. 4A) to permit the user to place the new call, moving the call identifier to lower bucket 201. The new call will be displayed in upper bucket 200 as shown in FIG. 4B, as upper bucket 200 generally displays the active line. Still referring to FIG. 4B, because both lines are in use (one active, the other on hold), swap button 406 will be displayed between buckets 200 and 201. Tapping swap button 406 will swap the calls such that the on hold call is swapped into the upper bucket 200 and becomes active, and the active call is swapped to the lower bucket 201 and is placed on hold as shown in FIG. 4C.

Figure 4D:
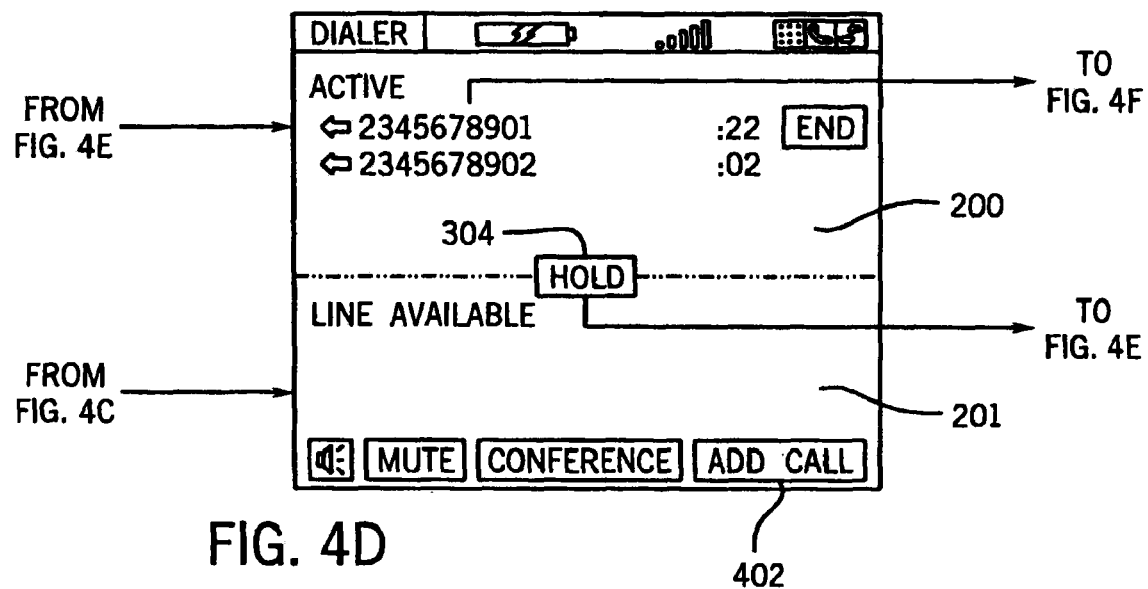
Figure 4E:
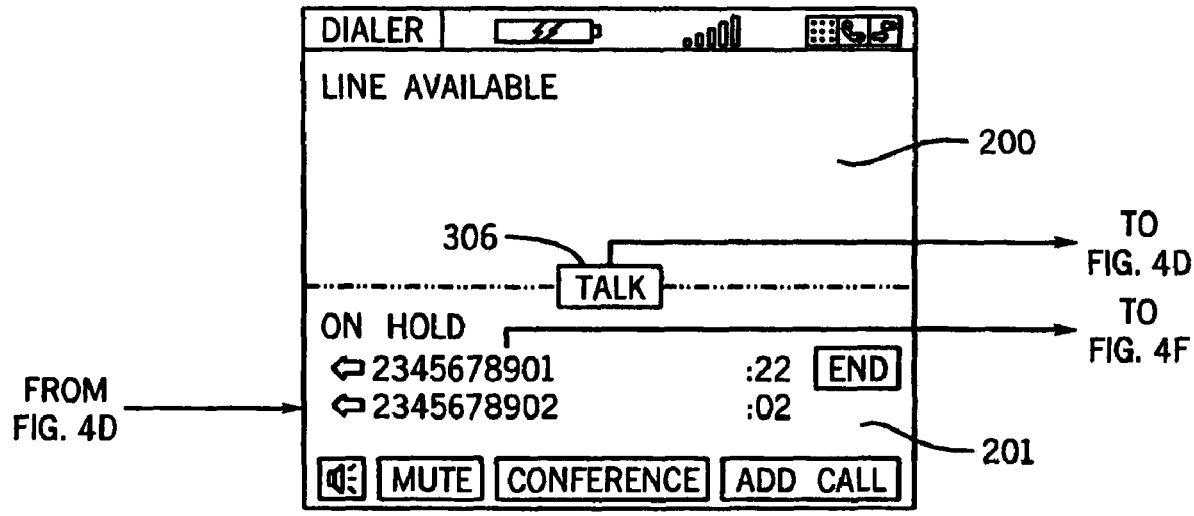

Referring to FIG. 4C, tapping conference button 404 moves the call currently on hold from lower bucket 201 into upper bucket 200. The calls are conferenced together on a single line permitting the user and both callers to all talk to each other. The graphic depicting this setup is shown in FIG. 4D. Because the on hold call from lower bucket 201 now resides in upper bucket 200 with the previously active call, one of the two phone lines is again available. The availability of one of the two phone lines is depicted in FIG. 4D by labeling lower bucket 201 "line available." Rather than swap button 406, hold button 304 is again disposed between upper bucket 200 and lower bucket 201. Tapping hold button 304 will move the entire active conference call into on hold status in lower bucket 201 as shown in FIG. 4E. The on hold callers can talk to each other while in this state. Tapping talk button 306 will permit user to again join conference call, as depicted in FIG. 4D.

Figure 4F:
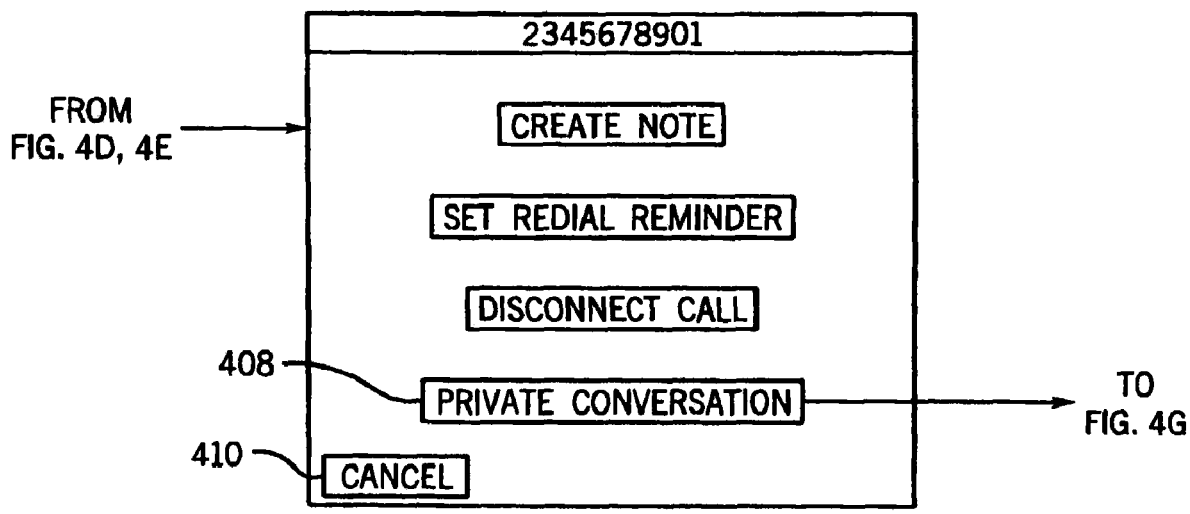
Figure 4G:
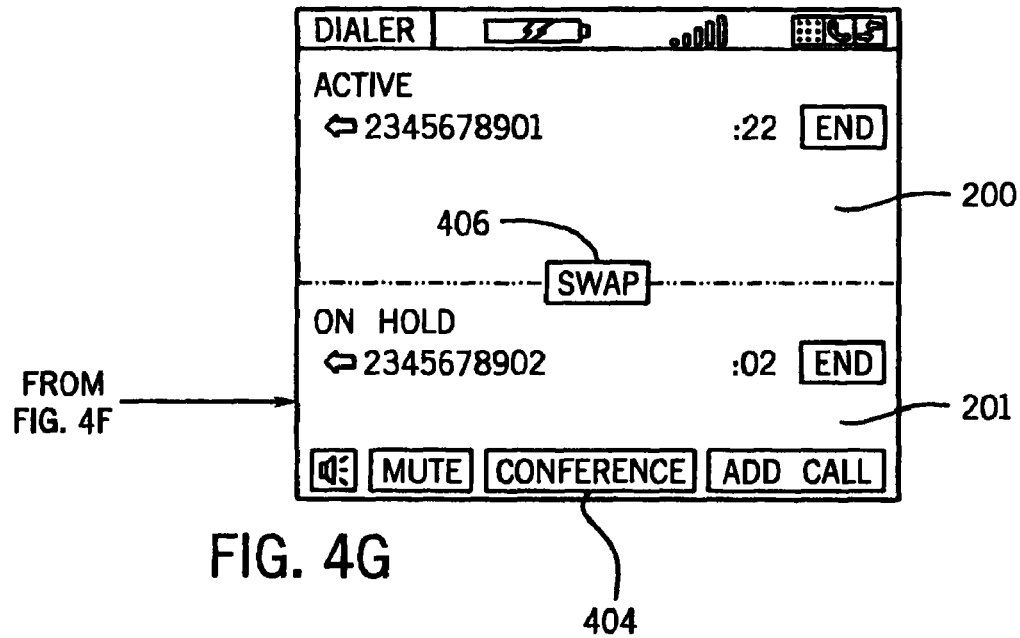

While a conference call is active, as shown in FIG. 4D, the user may tap on one of the listed contacts to display a call actions screen, shown in FIG. 4F. FIG. 4F is similar to FIG. 3E with the exception that the user may tap FIG. private conversation button 408 to extract a caller from the conference call line, thereby placing the conference call on hold and connecting the user with the individual caller. Tapping private conversation button 408 brings up the screen depicted in FIG. 4G, wherein the remaining caller from the original conference call is on hold, depicted in lower bucket 201, and the contact on which the user tapped originally is in active conversation with the user, depicted in upper bucket 200. Note that FIG. 4G is similar to FIG. 4C in that swap button 406 is again displayed. Tapping cancel button 410 in call action FIG. 4F will revert the user back to the original state of the conference call prior to tapping on one of the contact names.

Figure 5A:
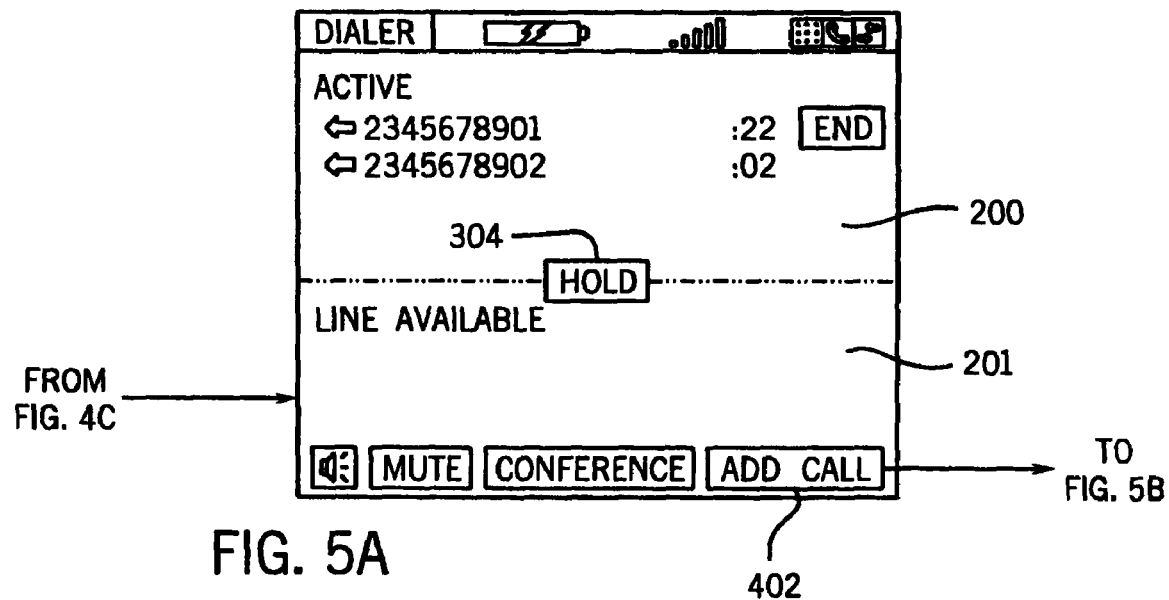
FIGS. 5A-5D illustrate screens associated with the management of three or more calls with a handheld computer.
Figure 5B:
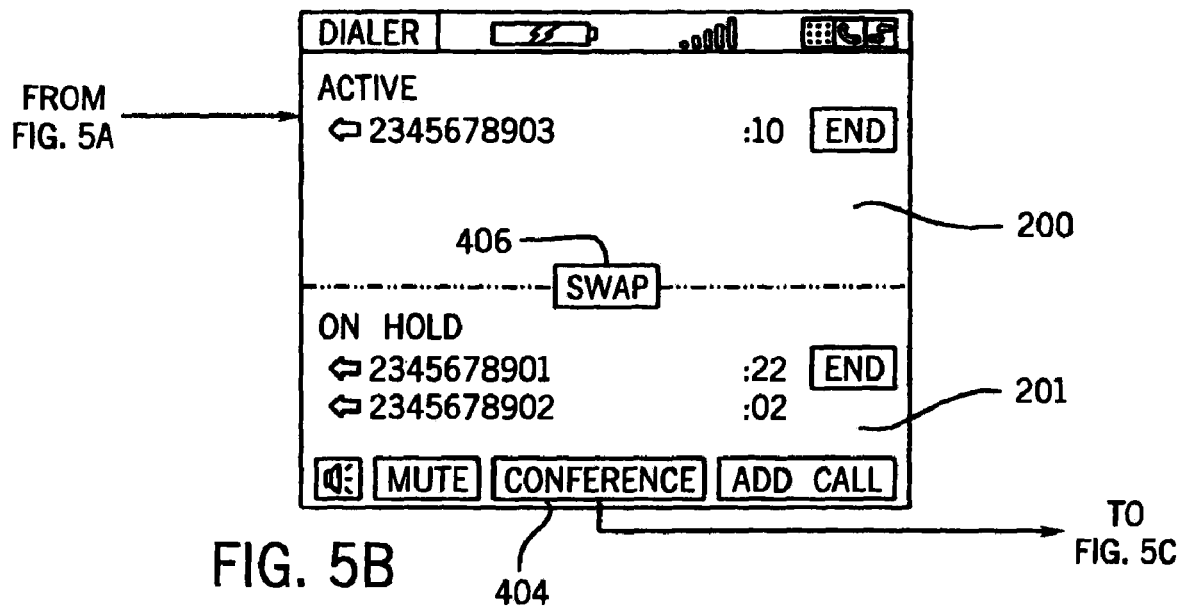

FIGS. 5A-5D depict the user interface for managing more than two callers. While a conference call is active on one line and the other line is available, as shown in FIG. 5A, the user may depress add call button 402 to call a third caller. When the add call button 402 is tapped, the active conference call is automatically placed on hold, depicted in lower bucket 201, and the new call is placed in active call status and depicted in upper bucket 200, as shown in FIG. 5B. With the conference call on hold and a single caller in active status as depicted in FIG. 5B, swap button 406 is displayed between buckets 200, 201 and may be activated by the user.

Figure 5C:
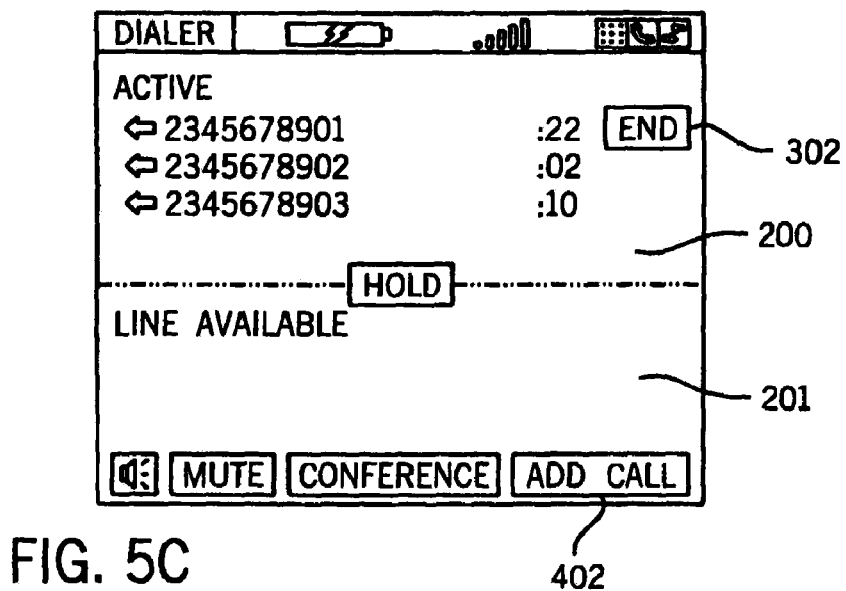
Figure 5D:
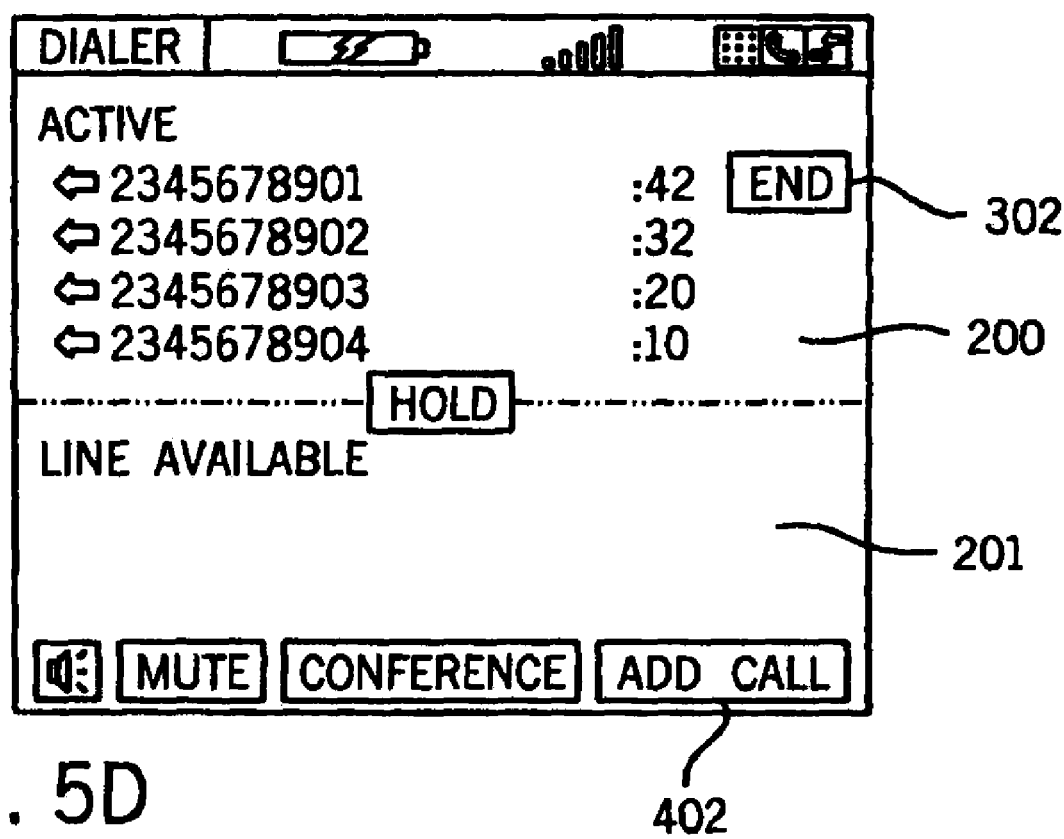

Further referring to FIG. 5B, if the user taps conference button 404, the upper bucket 200 caller will be added to the ongoing conference call, which will become active, permitting the user to participate as depicted in FIG. 5C. The conference call is depicted in upper bucket 200. A line then becomes available for the user to add yet another caller by tapping add call button 402. Tapping end button 302 will end the entire conference call. If the user taps add call button 402 and uses a dialer application to add another caller, the conference call will be automatically placed on hold, depicted in lower bucket 201, and the new caller put into the active call mode, depicted in upper bucket 200, using the same steps as detailed with respect to FIGS. 5A and 5B. The user may then swap the active call and conference call or conference the active call into the conference call. If the user conferences the new call into the ongoing conference call, there will then be four active calls on the conference call as depicted in FIG. 5D.

In an exemplary embodiment, handheld computer 100 may support a conference call including four callers on one line along with a separate call with a single caller on another line. This functionality fully supports GSM international standards, but may be subject to the support limitations of particular wireless carriers.

Regardless of how many callers are on a conference call, if the user taps one of the contact identifiers listed, a call actions screen will be called up similar to that shown in FIG. 4F to permit separating a caller from the conference call for a private conversation, or disconnecting a single caller out of an ongoing conference call. When multiple callers are on a conference call, display 14 will automatically reduce the font size for the contact names listed to support the larger amount of information displayed to the user.

The user interface discussed above with respect to FIGS. 2-5 is created through the execution of software residing on hand held computer 100. The software used to effectuate the interface may be part of an operating system, such as PALM OS, or may be a program loaded separately onto handheld computer 100. The software may be developed in any number of conventional programming languages. In other embodiments, the user interface instructions may be carried out by hard wired circuitry or a combination of circuitry and software.

The user interface described herein addresses the needs of the conventional art by presenting a user interface that allows call management supporting the full functionality set forth by GSM international standards. Further, the combination of a graphical user interface with touch screen capability permits a more efficient and user friendly call management interface than available on conventional devices, particularly cellular phones.

While the detailed drawings, specific examples and particular formulations given describe exemplary embodiments, they serve the purpose of illustration only. The hardware and user interface configurations shown and described may differ depending on the chosen performance characteristics and physical characteristics of the computing devices. For example, the various buttons or icons described above that effect various call management options may be labeled in various ways to indicate the option being selected. Further, the icons or buttons may be located in different portions of display 14 depending on the chosen user interface. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A portable electronic device, comprising:
   a housing;
   a processor supported by the housing;
   a memory coupled to the processor;
   a communications transceiver coupled to the processor, the transceiver configured to support voice conference calling between more than two parties; and
   a program stored in the memory and running on the processor, the program configured to provide a user interface on the display, the user interface configured to display indicators representative of the parties on the conference call, the user interface including a hold area of the display configured to display indicators representative of the parties on hold and an active area of the display configured to display indicators representative of the parties active on the conference call.

2. The portable electronic device of claim 1, wherein the user interface includes an icon configured to place at least one indicator representative of a party active on the conference call from the active area on hold.

3. The portable electronic device of claim 2, wherein the at least one indicator representative of a party active on the conference call from the active area is moved to the hold area.

4. The portable electronic device of claim 1, wherein the user interface includes a call timer associated with the call indicators.

5. The portable electronic device of claim 1, wherein the user interface is configured to provide a plurality of user selectable options when a call is selected.

6. The portable electronic device of claim 5, wherein the user selectable options includes a save to address book option.

7. The portable electronic device of claim 5, wherein the user selectable options includes a private conversation option.

8. The portable electronic device of claim 5, wherein the user selectable options includes a set redial reminder option.

9. The portable electronic device of claim 5, wherein the user selectable options includes a disconnect call option.

10. A method of managing a conference call on a handheld mobile telephone device, comprising:
    displaying to a user a screen including a new call option;
    initiating a first call at the request of a user;
    placing the first call on hold at the request of a user and placing an indicator representative of the first call in a hold section of the display;
    displaying to a user an available section of the display including a new call option;
    initiating a second call at the request of a user by selecting the new call option; and
    placing an indicator representative of the second call in an active section of the display.

11. The method of claim 10, further comprising:
    providing to a user a selectable option configured to swap the first call in the hold section with the second call in the active section.

12. The method of claim 10 wherein the mobile telephone device is a handheld computer.

13. The method of claim 10, further comprising:
    placing the calls in the active section on hold by selecting a hold option.

14. The method of claim 13, further comprising:
    selecting a new call option.

15. The method of claim 14, further comprising:
    placing a new call.

16. The method of claim 15, further comprising:
    selecting a conference option that effectuates the addition of the held calls to the new call.

17. A user interface for a radio enabled handheld computer display screen, comprising:
    a first screen portion providing a first indicator representative of a first call of a conference call;
    a second screen portion providing a second indicator representative of a second call of a conference call; and
    a user selectable option that is configured to effectuate movement of at least one of the first indicator and the second indicator to the other of the first and second screen portion.

18. The user interface of claim 17, wherein the first screen portion is representative of active calls.

19. The user interface of claim 17, wherein the second screen portion is representative of held calls.

20. The user interface of claim 17, wherein the first portion may contain indicators representative of up to four calls.

* * * * *